United States Patent
Schittenhelm et al.

(10) Patent No.: US 11,203,061 B2
(45) Date of Patent: Dec. 21, 2021

(54) DIE CAST COMPONENT

(71) Applicant: Bayerische Motoren Werke Aktiengesellschaft, Munich (DE)

(72) Inventors: Dominik Schittenhelm, Munich (DE); Jean-Marc Segaud, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 20 days.

(21) Appl. No.: 16/445,657

(22) Filed: Jun. 19, 2019

(65) Prior Publication Data
US 2019/0299279 A1 Oct. 3, 2019

Related U.S. Application Data

(63) Continuation of application No. PCT/EP2017/082944, filed on Dec. 15, 2017.

(30) Foreign Application Priority Data
Dec. 22, 2016 (DE) ..................... 10 2016 225 934.2

(51) Int. Cl.
*B22D 19/02* (2006.01)
*B22D 19/16* (2006.01)
*B22D 21/00* (2006.01)
*B22D 19/00* (2006.01)
*C23C 6/00* (2006.01)

(52) U.S. Cl.
CPC ......... *B22D 19/02* (2013.01); *B22D 19/0081* (2013.01); *B22D 19/16* (2013.01); *B22D 21/007* (2013.01); *C23C 6/00* (2013.01); *B60Y 2410/121* (2013.01); *Y10T 428/12493* (2015.01)

(58) Field of Classification Search
None
See application file for complete search history.

(56) References Cited

U.S. PATENT DOCUMENTS

| | | | |
|---|---|---|---|
| 3,213,766 A | 10/1965 | Hutto | |
| 4,097,019 A * | 6/1978 | Connors | ................ B22D 7/062 106/38.3 |
| 4,817,257 A | 4/1989 | Mascarenas | |
| 6,214,478 B1 | 4/2001 | Soell et al. | |
| 6,739,377 B2 | 5/2004 | Rueckert et al. | |
| 7,560,171 B2 | 7/2009 | Shiraishi et al. | |
| 2003/0209288 A1 | 11/2003 | Huang | |

(Continued)

FOREIGN PATENT DOCUMENTS

| | | |
|---|---|---|
| CN | 1723095 A | 1/2006 |
| DE | 1 476 050 B1 | 9/1970 |

(Continued)

OTHER PUBLICATIONS

English machine translation of DE102006043852, EPO, accessed Jan. 12, 2021.*

(Continued)

*Primary Examiner* — Xiaobei Wang
(74) *Attorney, Agent, or Firm* — Crowell & Moring LLP

(57) ABSTRACT

A die cast component includes an insert element with a plurality of form-fitting elements which are designed for the form-fitting connection of the insert element with a casting material. A ratio of a component wall thickness to a wall thickness of the insert element is a maximum of 4.

12 Claims, 2 Drawing Sheets

(56) References Cited

U.S. PATENT DOCUMENTS

| | | |
|---|---|---|
| 2005/0134087 A1 | 6/2005 | Behr et al. |
| 2007/0062768 A1* | 3/2007 | Hanna ................ F16D 65/0006 |
| | | 188/218 XL |
| 2007/0277645 A1 | 12/2007 | Weisskopf et al. |
| 2014/0007983 A1* | 1/2014 | Prest ................ B22D 19/0081 |
| | | 148/403 |
| 2015/0165523 A1 | 6/2015 | Osborne et al. |
| 2016/0008879 A1 | 1/2016 | Gong et al. |

FOREIGN PATENT DOCUMENTS

| | | |
|---|---|---|
| DE | 37 80 129 T2 | 2/1993 |
| DE | 196 39 052 A1 | 3/1998 |
| DE | 197 46 167 A1 | 4/1999 |
| DE | 101 40 332 C1 | 4/2003 |
| DE | 101 53 305 A1 | 5/2003 |
| DE | 101 60 581 A1 | 7/2003 |
| DE | 103 59 784 A1 | 7/2005 |
| DE | 10 2004 010 762 A1 | 9/2005 |
| DE | 10 2006 043 852 A1 | 5/2007 |
| DE | 10 2008 017 979 A1 | 11/2008 |
| DE | 10 2008 062 335 A1 | 6/2010 |
| DE | 10 2012 025 284 A1 | 6/2014 |
| DE | 10 2014 221 359 A1 | 4/2016 |
| DE | 10 2015 118 890 A1 | 5/2017 |
| EP | 1 571 070 A2 | 9/2005 |
| WO | WO 2008/128334 A1 | 10/2008 |

OTHER PUBLICATIONS

English machine translation of DE19746167, EPO, accessed Jan. 12, 2021.*

PCT/EP2017/082944, International Search Report dated Feb. 22, 2018 (Three (3) pages).

German Search Report issued in German counterpart application No. 10 2016 225 934.2 dated Jul. 25, 2017, with Statement of Relevancy (Eight (8) pages).

Chinese Office Action issued in Chinese application No. 201780068593.7 dated Jul. 20, 2020 (Nine (9) pages).

\* cited by examiner

DIE CAST COMPONENT

CROSS REFERENCE TO RELATED APPLICATIONS

This application is a continuation of PCT International Application No. PCT/EP2017/082944, filed Dec. 15, 2017, which claims priority under 35 U.S.C. § 119 from German Patent Application No. 10 2016 225 934.2, filed Dec. 22, 2016, the entire disclosures of which are herein expressly incorporated by reference.

BACKGROUND AND SUMMARY OF THE INVENTION

The present invention relates to a die cast component, to a method for producing a die cast component and to the use of a casting method.

It is known to use components, such as aluminum castings, consisting of light metals as structural components, for example in vehicle construction, in order to obtain weight reductions. However, the use of light metals in the application areas thereof is limited, since their stiffnesses, for example in relation to steel, are considerably lower. Thus, in some intended uses of light metal, there is a discrepancy between its stiffness and the available installation space. The required stiffnesses are often achieved by ribbing or material accumulations. However, the installation space necessary for this purpose is possibly not present. Moreover, much lightweight construction potential is wasted. Therefore, a known approach is the implementation of cast hybrid components which are based on the combination of different materials. Problematic in this connection, however, is the permanent connection of the different materials over the entire service life of the components. However, in order to allow a use in highly loaded regions, for example for structural components in automotive applications, the quality and durability of the connection of the different materials is indispensable.

It is therefore an object of the present invention to specify a cast component, a casting method and the use of a cast component which eliminate the aforementioned disadvantages and are at the same time extremely light, stiff and cost-efficient.

According to the invention, a die cast component, consisting of a casting material or comprising a casting material, comprises an insert element, wherein the insert element has a plurality of form-fitting elements which are designed for the form-fitting connection of the insert element to the casting material, in particular in die casting, and wherein a ratio of a component wall thickness to a wall thickness of the insert element is at most 4. The form-fitting elements advantageously allow interlocking of the insert element with the casting material, in particular during or in the die casting, thus in other words during the die casting process. A, particularly purely, mechanical connection of the insert element to the surrounding casting material is expediently achieved. As a result, both a permanent connection of the insert element to the surrounding casting material is established and an optimum force transmission into the considerably stiffer insert element is ensured. With regard to an optimum increase in stiffness, it has been found that a crucial factor is a size of the encapsulating wall thickness. This is advantageously as small as possible. In preferred embodiments, it lies, for example, in a range from about 0.8 to 2.5 mm, particularly preferably in a range from about 1 to 2 mm. If, for casting-related reasons, a 2 mm-thick encapsulating wall thickness is necessary, an efficient increase in stiffness particularly starting from component wall thicknesses of greater than 6 mm is expedient. A wall thickness of the insert element is then advantageously above 2 mm. According to a preferred embodiment, particularly against the background of an optimum increase in stiffness, the aforementioned ratio is between 1.1 and 3.

Conventional pressures for die casting lie in a range of about 600 bar.

According to one embodiment, the form-fitting elements are holes, for example round, in particular circular, holes, bores, openings and/or recesses or setbacks. In preferred embodiments, a spacing of the hole center points corresponds to 2 to 3 times a wall thickness of the insert element. For a best possible reinforcing effect, a spacing of about 2.5 times the wall thickness of the insert element has proved optimal.

According to one embodiment, the hole diameter, in particular thus the diameter of the round or circular holes, corresponds to the wall thickness of the insert element. Alternatively, the hole diameter is up to 20%, preferably 10%, greater or less than the wall thickness of the insert element.

The recesses are in particular material recesses or material setbacks or, for example, "holes" which are designed not to be through-passing (with respect to the wall thickness of the insert element). By virtue of the fact that the component is produced or manufactured by the die casting method, it is possible for even very small holes, bores, openings or recesses to be infiltrated. Such form-fitting elements can be, for example, round, in particular circular, but also oval or polygonal/angular, such as, for example, triangular, quadrangular or rectangular, such as, for example, slot-shaped. The choice of the geometry has a decisive influence on the degree of reinforcement and the stability of the connection and must be dependent on the individual case. Particularly on account of the favorable notch effect, circular holes have proved very advantageous particularly in terms of stability of the connection.

Alternatively or in addition, a plurality of projections, for example in the form of nubs, webs, grooves or the like, are also provided in order to allow the aforementioned "interlocking".

The holes, bores, openings, recesses, projections and/or setbacks, etc., that are mentioned preferably extend substantially perpendicularly with respect to an upper or outer surface of the (die cast) component or the insert element, but can also extend at an inclination or obliquely thereto. The position of the form-fitting elements or of the perforations is advantageously designed to be load-specific.

According to a preferred embodiment, the insert element has round, in particular circular, holes, preferably having a diameter of about 2 to 8 mm, particularly preferably having a diameter of about 3 to 6 mm, especially preferably having a diameter of about 5 mm.

A minimum thickness of the casting material or layer thickness surrounding the insert element is expediently about 2 mm (or else more), but expediently, and where possible in casting terms, also less, with the result that extremely thin-walled, light and at the same time stiff components can be realized. Ideally, the surrounding layer thickness or the encapsulating wall thickness is, for example, about 1 to 2 mm.

In principle, the form-fitting elements can also be designed to differ, for example to comprise holes or geometries of different size, wherein, for example, round holes can be combined with angular holes, etc. It holds in principle that the stiffness of the insert element is weakened all the less the smaller, for example, the holes or recesses, etc., or the smaller the number thereof. The form-fitting elements allow the permanent connection of the insert element, with the result that an optimum compromise must be chosen, dependent on the individual case, here in a component-specific manner.

According to one embodiment, the casting material is, for example, a light metal or a light metal alloy, for example consisting of aluminum, magnesium, aluminum alloys and/or magnesium alloys. Aluminum-silicon alloys or aluminum-magnesium alloys are expediently used.

In preferred embodiments, the insert element is produced or manufactured from a steel material, for example. The insert element is expediently formed from a material which ensures deformability to give a desired geometry. The strengths of the chosen material preferably lie considerably above those of the casting material or of the casting matrix.

According to one embodiment, the insert element is a square-hole metal sheet, a round-hole metal sheet, a slotted-hole metal sheet, expanded metal and/or a lattice structure or wire structure. The form-fitting elements are advantageously incorporated by a separating production method, such as, for example, by a punching method, in particular punch riveting, but can also be drilled or be formed directly during or by the production of the insert element (cf. expanded metal, lattice structure or wire structure).

According to one embodiment, the form-fitting elements are arranged substantially homogeneously or in a uniformly distributed manner in the insert element or across the insert element. The form-fitting elements are thus, for example, expediently arranged regularly spaced apart or in a matrix shape or in a checkered manner or in a ring or star shape or in the form of rays. Alternatively, an irregular pattern can also be advantageous, this pattern being produced by the geometry of the corresponding component.

Webs are formed between the form-fitting elements, in particular the holes. Depending on the component geometry, webs cannot or do not have to be the same size. However, a maximum web width is preferably about 1.5 to 3 times the size of a minimum web width. In preferred embodiments, the ratio of the maximum web width to the minimum web width is about 2.

A spacing of the form-fitting elements from one another is preferably designed to be substantially the same, thereby ensuring that a very uniform connection with the melt or the casting material can be achieved. According to a preferred embodiment, the form-fitting elements are round, in particular circular, for example punched, holes having a diameter of about 1 to 5 mm, wherein their spacing is, for example, in a range of about 1 to 50 mm. For production-related reasons, a spacing of circular (punched) holes advantageously corresponds to at least their hole diameter.

According to one embodiment, the insert element is (additionally) coated at least in certain regions or provided with a surface treatment. Suitable for a coating for an insert element consisting of a steel material are, for example, the materials zinc, copper and/or aluminum. Such a coating, which possibly on its own account could not ensure a reliable and in particular durable connection of the insert element, can, in the present case, ideally support the function and mode of action of the form-fitting elements.

The coating or the surface treatment advantageously ensures a targeted roughening of the surface of the insert element or, more generally, creates a surface, with the result that, during encapsulation, a micro-form fit can be created since the melt can penetrate into the depressions in the surface, in other words infiltrates them. For process-related reasons, such an infiltration of the surfaces is possible particularly in die casting since this method can also allow very fine interlockings.

According to one embodiment, the insert element has form-fitting portions in which the form-fitting elements are provided. The form-fitting elements are expediently arranged in these form-fitting portions, as already mentioned, in a homogeneous or uniformly distributed manner. In addition, however, there are also regions in the insert element where no form-fitting elements are provided. These can be, for example, regions in which the insert element or the cast component has a shape which makes the provision of the form-fitting elements, for example in the form of holes, more difficult. This can be the case, for example, if the cast component or the insert element provides a very narrow radius at a point.

According to one embodiment, a wall thickness of the insert element is designed to differ, wherein typical wall thicknesses lie in a range of about 1 to 2 mm. Depending on the available casting volume, the cast part can be filled up to a residual encompassing thickness of about 2 mm. The insert element or the cast component as such is expediently topology-optimized, thus being based on the fact that a favorable basic design has been determined, for example by a computer-based computation method.

In this respect, a targeted functional separation occurs in the present case, since the mechanical properties of the insert element are set particularly by its wall thickness or basic shape, but not by the form-fitting elements. The form-fitting elements are expediently provided to allow a best possible connection, for example by the infiltration with the surrounding casting material.

According to one embodiment, the insert element is designed to be double-walled and/or hollow at least in certain regions. The insert element can expediently also form undercuts or pockets, with the result that the stiffness of the insert element can be additionally increased. In addition, however, the insert element can also have one or more cutouts. Such cutouts make it possible to obtain an additional weight advantage or to reduce the stiffness of the cast component in a targeted manner. The term "cutout" is to be understood to the effect that its size, diagonal or diameter is greater by a multiple than the wall thickness of the insert element, for example by a multiple of at least 20. Such a cutout can be formed in the insert element as an opening or hole, for example round or polygonal/angular, and/or as a setback.

As already mentioned, the insert element is preferably formed from a metal, in particular a steel material. Alternatively, the insert element can also be shaped or formed from another material of high stiffness, for example of a composite material, in particular of a fiber-reinforced plastic composite material of suitable temperature resistance. A coefficient of thermal expansion of the insert element in relation to the matrix material is preferably in a ratio of between 1:1 and 1:2, but preferably of 1:1.5. In preferred embodiments, a coefficient of thermal expansion of the insert element, in particular of a steel insert, is 10 to $13 \times 10^{-6}$ 1/K.

According to one embodiment, the insert element is also produced by means of a generative manufacturing method, such as, for example, selective laser melting, electron beam melting or selective laser sintering. The additive/generative manufacturing methods can be accompanied by the advantage that, during the production of the insert element as such, the form-fitting elements can also be concomitantly formed/shaped directly and integrally. A further advantage is the absolute design freedom.

A ratio of a stiffness of a material of the insert element to a stiffness of the casting material expediently lies in a range of about 2 to 4, particularly preferably in a range of about 3. The moduli of elasticity of the corresponding materials preferably lie in the stated ranges. The insert element is advantageously surrounded by the casting material, in other words encased, in a substantially uniform manner, in particular with the same or constant wall thickness. The insert element is preferably as stiff as possible while having a low relative density.

According to one embodiment, the insert element is shaped by a forming method, in the case of a metal insert element for example, by a deep-drawing method. Alternatively or in addition, machining, for example of a solid material, is also at least partially provided. The insert element advantageously has a shape of the die cast component or determines this shape, at least in certain regions. In other words, it is possible, for example, for the shape of the finished cast component already to be evident from the shape of the insert element, at least in certain regions.

According to one embodiment the cast component can also comprise a plurality of insert elements. The shape of the cast component is then, for example, as it were pieced together by a plurality of insert elements, wherein these insert elements can differ, for example, in terms of the wall thickness or of the material used. According to one embodiment, the cast component is also reinforced by the insert element only locally or in certain regions, for example in a highly loaded region or in the region of a joining point, where the component is screwed, etc.

The insert element is preferably surrounded, as already mentioned, in particular encased, uniformly by or with the casting material. Here, in preferred embodiments, a ratio of a component wall thickness to an insert element wall thickness is at most about 4. According to one embodiment, a minimum layer thickness of the casting material is about 2 mm or more.

The insert element is preferably completely encapsulated or surrounded by the casting material. This advantageously makes it possible to avoid any contact corrosion problem (an access of electrolyte is not possible).

The insert element makes it possible to achieve (local) stiffness increases in the cast component with reduced installation space and (at least) weight neutrality. In this respect, it is advantageously possible to achieve significant stiffness increases, with the construction unchanged.

The invention is further directed at a casting method, in particular at a die casting method, for producing a cast component having an insert element, comprising the following steps:

preparing an insert element in such a way that infiltration, a form fit and/or a micro-form fit with a casting material can be achieved;

encapsulating the insert element with the casting material in such a way that an encapsulating wall thickness is less than 2.5 mm.

The encapsulating wall thickness is particularly preferably about 1 to 2 mm. In order to allow the infiltration or the form fit or micro-form fit, the casting method is advantageously a die casting method. The method further comprises method steps familiar to a person skilled in the art of casting, such as inserting the insert element into the (die casting) mold, etc.

The invention is also directed at the use of a casting method according to the invention for producing structural components, particularly in the automotive or automobile construction sector. Typical components are, for example, suspension turrets, longitudinal members, A/B/C pillars, etc., or frame components, etc.

For the method according to the invention and for the use according to the invention, the advantages and features mentioned in connection with the die cast component apply analogously and correspondingly, and vice versa. Further advantages and features will become apparent from the following description of cast components with reference to the appended Figures. Here, different features can be combined with one another within the scope of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
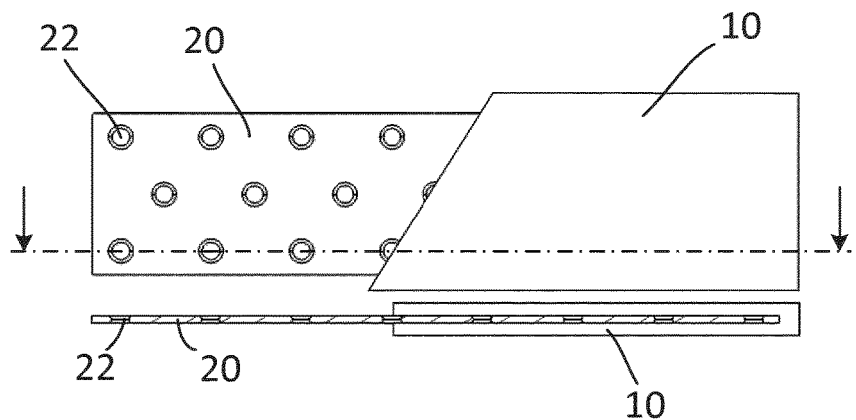
FIG. 1 shows a schematic view of a cast component, partially sectioned.

FIG. 1 shows, in the upper image half, a cast component, comprising a casting material 10 which surrounds or encases an insert element 20. The insert element 20, comprising a plurality of form-fitting elements 22 (in the form of holes in the schematic view shown in FIG. 1), is only partially surrounded by the casting material 10, in other words being exposed as it were in order to be able to better explain the basic structure. In a lower image half, as indicated by the section line, a corresponding section is folded down, this section showing how the insert element 20, comprising the form-fitting elements 22, is arranged within the casting material 10 or how the form-fitting elements/holes 22 are infiltrated or penetrated by the casting material 10.

Figure 2:
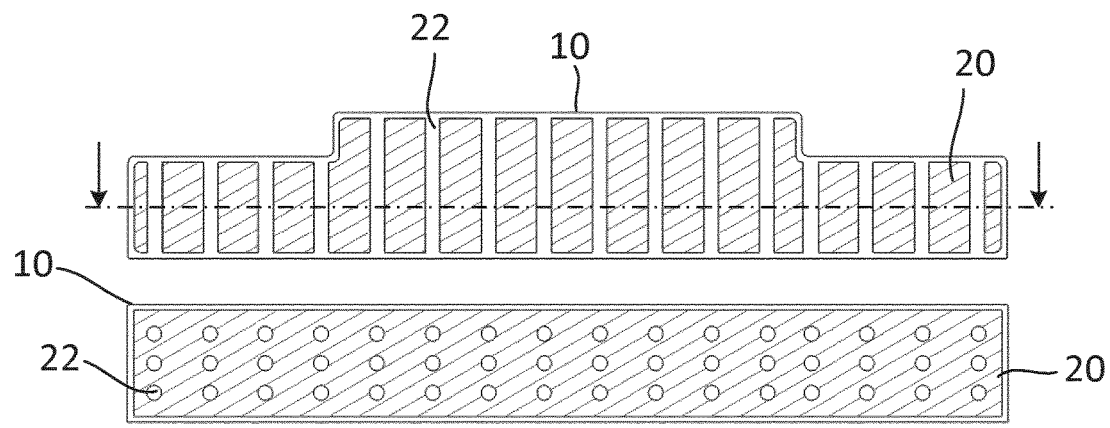
FIG. 2 shows a sectional view of a further schematic illustration of a cast component.

FIG. 2 shows, in the upper image half, a sectional illustration of an insert element 20 which likewise has a plurality of form-fitting elements 22, in the form of through-holes, and is surrounded by a casting material 10. The form-fitting elements 22 are infiltrated by the casting material 10. A component which is topology-optimized in terms of the requirements is created via the shape of the insert element 20, in particular via the different wall thickness. Whereas thus the connection to the casting material 10 is ensured via the form-fitting elements 22, it is the case that, via the shape of the insert element 20 as such, its strength and stiffness behavior, and thus that of the overall component, is set. In the lower image half, a corresponding section is folded down. The substantially circular form-fitting elements 22 are thus evident.

Figure 3:
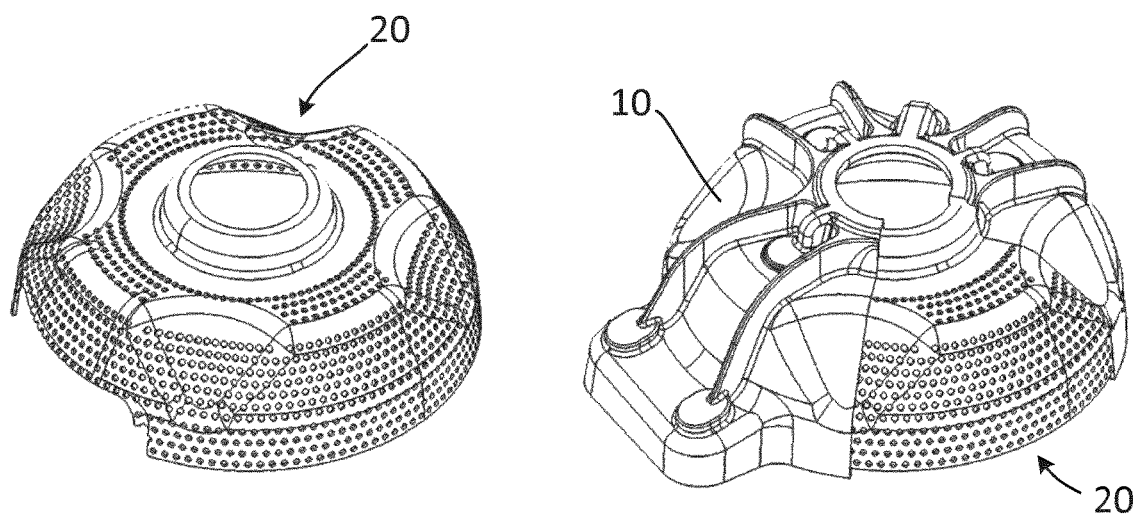
FIG. 3 shows two perspective views of an insert element and of a cast component, illustrated in partially sectioned form.

FIG. 3 shows, in its left image half, an insert element 20 which has a plurality of form-fitting elements 22 (without reference sign). In the right image half, the known insert element is embedded or encased in a casting material 10. In this way there is created a cast component which is used, for example, as a suspension turret. The shape of the insert element 20 already reveals the shape of the finished component. The casting material 10, which also forms some stiffening ribs in the embodiment shown here, otherwise has or reproduces the shape of the insert element 20. In this respect, the insert element 20 is surrounded by the casting material 10 with a substantially constant wall thickness. There is created an extremely thin-walled component which is extremely light while having maximum strength.

Figure 4:
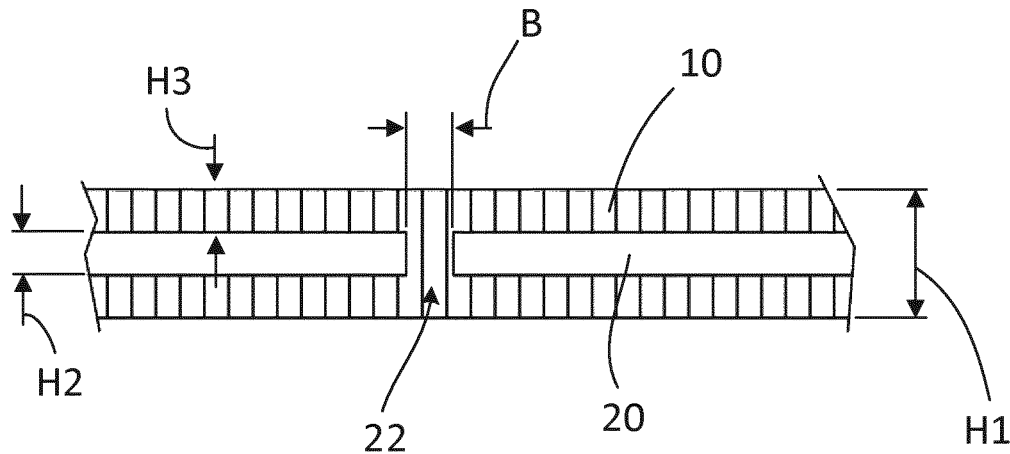
FIG. 4 shows a sectional illustration of a cast component.

FIG. 4 shows in a sectional illustration a (die) cast component, comprising an insert element 20 which is encased by casting material 10. Designated by the reference sign 22 there can be seen a form-fitting element in the form of a through-hole. A ratio of a wall thickness H1 of the die cast component in the region of the form-fitting element 22 to a (minimum) width or a diameter B of the form-fitting element 22 lies in a range of about 10 to 0.2, in the present case about 2.8. Here, in preferred embodiments, a ratio of the component wall thickness H1 to an insert element wall thickness H2 lies in a range of about 1.1 to 5, particularly preferably in a range of about 1.2 to 3, in the present case about 2.7. Reference sign H3 designates an encapsulating wall thickness which, in preferred embodiments, is about 1 to 2 mm. It has been shown that a high specific increase in stiffness can be realized with these values.

Figure 5:
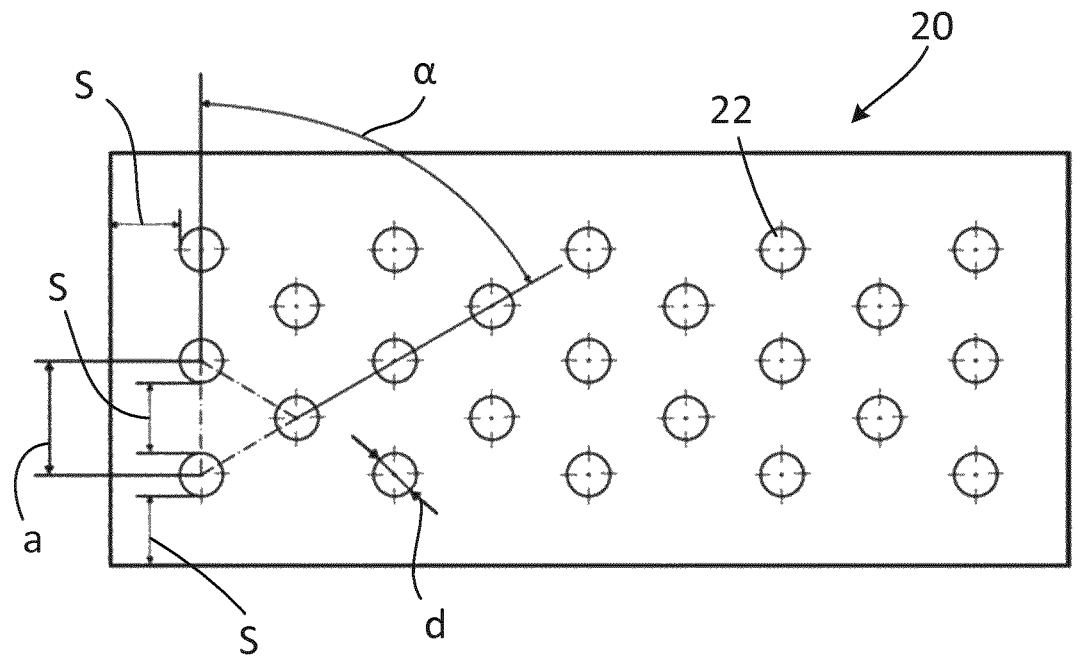
FIG. 5 shows a plan view of an embodiment of an insert element.

FIG. 5 shows a plan view of an insert element 20, comprising a plurality of circular form-fitting elements or holes 22, arranged according to a preferred embodiment in diagonally offset rows. Reference sign "a" designates a spacing of the holes 22 in a row. The spacing preferably corresponds to about 2.5 times a diameter of the form-fitting elements, in the present case a hole diameter d. In the embodiment illustrated here, the hole diameter d is about 5 mm. A hole pitch "t" at an angle α of about 60° has proved to be optimum. The reference sign S designates web widths. In order to limit stress peaks in the surrounding casting material, for example in the aluminum matrix, it is particularly advantageous if the web widths S are as homogeneous as possible. This means in practice that a maximum web width is about at most 2 times the size of a minimum web width.

LIST OF REFERENCE CHARACTERS

10 Casting material
20 Insert element
22 Form-fitting element, hole, recess, opening
t Pitch
a Spacing
d Diameter
S Web width
H1 Wall thickness of component
H2 Wall thickness of insert element
H3 Encapsulating wall thickness
B Diameter, width of form-fitting element (hole, opening)

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A die cast component, comprising:
    a metal or metal alloy casting material; and
    an insert element, wherein the insert element has a plurality of form-fitting elements which are arranged homogenously or in a uniformly distributed manner in the insert element and which are configured for form-fitting connection of the insert element to the casting material, wherein a ratio of a wall thickness of the die cast component to a wall thickness of the insert element is at most 4, wherein the form-fitting elements are round holes, and wherein the round holes have a diameter of 2 to 8 mm.

2. The die cast component as claimed in claim 1, wherein a spacing of respective center points of the round holes corresponds to 2 to 3 times the wall thickness of the insert element.

3. The die cast component as claimed in claim 1, wherein webs are formed between the form-fitting elements and wherein a maximum width of the webs is 1.4 to 3 times a minimum width of the webs.

4. The die cast component as claimed in claim 2, wherein webs are formed between the form-fitting elements and wherein a maximum width of the webs is 1.4 to 3 times a minimum width of the webs.

5. The die cast component as claimed in claim 1, wherein the wall thickness of the insert element varies.

6. The die cast component as claimed in claim 2, wherein the wall thickness of the insert element varies.

7. The die cast component as claimed in claim 1, wherein the insert element is double-walled and/or hollow at least in regions.

8. The die cast component as claimed in claim 1, wherein the insert element has one or more cutouts.

9. The die cast component as claimed in claim 1, wherein a coefficient of thermal expansion of the insert element is less than $13 \times 10^{-6}$ 1/K.

10. The die cast component as claimed in claim 1, wherein the insert element is uniformly surrounded by, or with, the casting material.

11. A casting method for producing a die cast component having an insert element, comprising the acts of:
    forming the insert element such that an infiltration, a form fit and/or a micro-form fit is achieved with a metal or metal alloy casting material, wherein the insert element has a plurality of form-fitting elements which are arranged homogenously or in a uniformly distributed manner in the insert element, wherein the form-fitting elements are round holes, and wherein the round holes have a diameter of 2 to 8 mm; and
    encapsulating the insert element with the casting material such that an encapsulating wall thickness of the casting material is less than 2.5 mm, and wherein a ratio of a wall thickness of the die cast component to a wall thickness of the insert element is at most 4.

12. The method as claimed in claim 11 wherein the die cast component is an automotive structural component.

* * * * *